(12) United States Patent
Bertens (10) Patent No.: US 9,443,160 B2
(45) Date of Patent: Sep. 13, 2016

(54) IRRADIATION FIELD RECOGNITION

(75) Inventor: Tom Bertens, Perk (BE)

(73) Assignee: AGFA HEALTHCARE NV, Mortsel (BE)

( * ) Notice: Subject to any disclaimer, the term of this patent is extended or adjusted under 35 U.S.C. 154(b) by 275 days.

(21) Appl. No.: 13/982,175

(22) PCT Filed: Feb. 27, 2012

(86) PCT No.: PCT/EP2012/053252
§ 371 (c)(1),
(2), (4) Date: Jul. 26, 2013

(87) PCT Pub. No.: WO2012/123242
PCT Pub. Date: Sep. 20, 2012

(65) Prior Publication Data
US 2013/0308851 A1 Nov. 21, 2013

Related U.S. Application Data

(60) Provisional application No. 61/452,810, filed on Mar. 15, 2011.

(30) Foreign Application Priority Data

Mar. 15, 2011 (EP) .................................... 11158188

(51) Int. Cl.
*G06T 7/00* (2006.01)
*G06K 9/34* (2006.01)

(52) U.S. Cl.
CPC .............. *G06K 9/34* (2013.01); *G06T 7/0081* (2013.01); *G06T 2207/10116* (2013.01); *G06T 2207/20061* (2013.01); *G06T 2207/20152* (2013.01)

(58) Field of Classification Search
CPC .................. G06T 7/0081; G06T 2207/10116; G06T 2207/20036; G06T 2207/20061; G06T 2207/20152; G06K 9/34
See application file for complete search history.

(56) References Cited

U.S. PATENT DOCUMENTS 5,506,913 A * 4/1996 Ibison et al. .................. 382/132
5,901,240 A    5/1999 Luo et al.
7,570,792 B2 * 8/2009 Takahashi ..................... 382/132

(Continued)

FOREIGN PATENT DOCUMENTS

EP    0 610 605 A1    8/1994
EP    1 562 143 A2    8/2005

OTHER PUBLICATIONS

Huang et al., "Image retrieval using both color and local spatial feature histograms", ICCCAS 2004., vol. 2 , 927-931.*

(Continued)

*Primary Examiner* — Katrina Fujita
(74) *Attorney, Agent, or Firm* — Keating and Bennett, LLP (57) ABSTRACT

A method to extract irradiation field areas in an X-ray image represented by a digital signal representation comprising the steps of segmenting the image in multiple regions of pixels which have similar local image characteristics, fitting line segments to the boundaries of these regions whereby said line segments correspond with candidate irradiation field boundaries and constitute a segmentation map, classifying regions in said segmentation map into at least two classes, one class being irradiation field and the other class being collimated region on the basis of at least one of local, regional and global image characteristics.

13 Claims, 9 Drawing Sheets

(56) References Cited

U.S. PATENT DOCUMENTS

| | | | |
|---|---|---|---|
| 8,965,108 B2* | 2/2015 | Chabanas | G06K 9/6205 382/128 |
| 2009/0238433 A1* | 9/2009 | Rao | G06T 7/0085 382/132 |
| 2009/0290779 A1* | 11/2009 | Knapp et al. | 382/132 |

OTHER PUBLICATIONS

Grimson et al., "On the Sensitivity of the Hough Transform for Object Recognition", 1990, Pattern Analysis and Machine Intelligence, IEEE Transactions on, vol. 12, Iss: 3, 255-274.*

Luo et al., "Collimation detection for digital radiography", Proc. SPIE 3034, Medical Imaging 1997: Image Processing, 74.*

Wang et al., "Method for recognizing multiple radiation fields in computed radiography", Proc. SPIE 3661, Medical Imaging 1999: Image Processing, 1625.*

Blaffert, T., et al., "The Laplace Integral for a Watershed Segmentation," Image Processing, 2000. Proceedings. 2000 International Conference on Sep. 10-13, 2000, IEEE, vol. 3, pp. 444-447.

Dam, E., et al., "Non-linear Diffusion for Interactive Multi-scale Watershed Segmentation," Medical Image Computing and Computer-Assisted Intervention—MICCAI 2000, Lecture Notes in Computer Science, vol. 1935, 2000, pp. 217-224.

Pham, D.L., et al., "Current Methods in Medical Image Segmentation," Annual Review of Biomedical Engineering, vol. 2, Aug. 2000, pp. 315-337.

International Search Report, mailed Jun. 19, 2012, from counterpart International Application No. PCT/EP2012/053252, filed Feb. 27, 2012.

* cited by examiner

IRRADIATION FIELD RECOGNITION

RELATED APPLICATIONS

This application is a §371 National Phase Application of International Application No. PCT/EP2012/053252, filed on Feb. 27, 2012, now International Publication No. WO 2012/123242 A1, published on Sep. 20, 2012, which International Application claims the benefit under 35 U.S.C. §119(e) of U.S. Provisional Application No. 61/452,810, filed on Mar. 15, 2011, and also claims priority to European Application No. EP 11158188.0, filed on Mar. 15, 2011, all three of which are incorporated herein by reference in their entirety.

FIELD OF THE INVENTION

The present invention relates to a method to extract irradiation field area in an X-ray image represented by a digital signal representation.

BACKGROUND OF THE INVENTION

In digital radiography X-ray opaque material is used to protect subjects against unnecessary exposure to X-rays, to limit the radiation scattering and to obtain multiple irradiation fields on a recording medium such as a stimulable phosphor sheet. The region outside the irradiation fields will have high luminance when the image is displayed on a display device. The strong light will have a negative impact on the efficiency and accuracy of the diagnosis.

Therefore automatic recognition of the irradiation field and blackening of the region outside the delineated irradiation fields is an important part of image processing of digital radiographic images.

Prior art techniques are edge based. The digital greyscale image is searched for pixels constituting the boundary between irradiation fields and the shadow of the x-ray opaque material. These pixels are grouped into candidate line segments to obtain a correct delineation of the irradiation fields. The candidate line segments are evaluated against a rule set of often local image characteristics. A patent following this general idea for irradiation field recognition is EP 0610605. Another patent based on this idea is U.S. Pat. No. 5,901,240.

These edge-based approaches may fail in cases where the edges are hardly distinguishable in the image. This is the case for images with high scatter radiation. In these images the transition between irradiation field and the shadow of the x-ray opaque material is not an edge but a gradual transition zone.

Another category of images that may cause failure of the edge-based approach are low dose images with a very low contrast between the irradiation field and the shadow of the x-ray opaque material. An example is a lateral nose image in which the transition between the dense bone of the skull and the shadow of the x-ray opaque material has low contrast.

It is an aspect of the present invention to provide a method for extracting the irradiation fields in an x-ray image that overcomes the above disadvantages.

SUMMARY OF THE INVENTION

The above-mentioned aspects are realised by a method as set out in claim 1. Specific features for preferred embodiments of the invention are set out in the dependent claims.

The present invention relates to a region-based method of recognizing an irradiation field in digital x-ray image, region-based in the sense that the candidate irradiation field boundaries are computed out of a segmented map of the image and not directly out of the greyscale image.

The proposed method is a 3-step process. The first step is obtaining an accurate segmentation of the image into multiple regions.

The second step is fitting line segments to the region boundaries whereby the line segments are candidate irradiation field boundaries and constitute a new segmentation map.

The third step is identifying in the new segmentation map the regions corresponding to irradiation fields using local and/or regional and/or global image characteristics.

The method of the present invention is generally implemented in the form of a computer program product adapted to carry out the method steps of the present invention when run on a computer. The computer program product is commonly stored in a computer readable carrier medium such as a DVD. Alternatively the computer program product takes the form of an electric signal and can be communicated to a user through electronic communication.

Further advantages and embodiments of the present invention will become apparent from the following description and drawings.

DETAILED DESCRIPTION OF THE INVENTION

The proposed method is a 3-step process. The first step is obtaining an accurate segmentation of the image into multiple regions.

The second step is fitting line segments to the region boundaries whereby the line segments are candidate irradiation field boundaries and constitute a new segmentation map.

The third step is identifying in the segmentation map the regions corresponding to irradiation fields using local, regional and global image characteristics.

Segmentation

In the described embodiment, the segmentation of the image into multiple regions involves a multi-scale watershed technique and a clustering technique.

The multi-scale watershed technique has some advantages over the standard watershed technique.

The multi-scale watershed technique has a better edge focus compared to the basic watershed technique in which blurring affects the shape of the segmented objects.

The multi-scale watershed technique does not provide a complete segmentation, but provides a coarse segmentation into regions of varying sizes which can form building blocks for an advanced, more specialized segmentation process.

A detailed description of the multi-scale watershed segmentation can be found in "Front-End Vision and Multi-Scale Image Analysis" by Bart M. ter Haar Romeny, ISBN 1-4020-1502-8.

The multi-scale watershed segmentation requires a measure of dissimilarity in scale-space.

A simple definition of dissimilarity measure at a specific scale is the gradient magnitude squared, computed using the $1^{st}$ order Gaussian derivatives.

Combining $1^{st}$ order and $2^{nd}$ order Gaussian derivatives results is a better edge focusing for the images with relatively high scatter radiation and thus a bad edge definition and relatively wide transition zone between irradiation field and the shadow of the x-ray opaque material, also referred to as collimation region.

The squared gradient magnitude $L_X^2+L_Y^2$ is combined with a clipped version of $L_{WW}$ which is de derivative of the gradient in the gradient direction. Local maxima and minima of $L_{WW}$ indicate the largest gradient changes.

$L_{WW}$ can be computed out of $1^{st}$ and $2^{nd}$ order Gaussian derivatives as:

$$L_{ww} = \frac{L_X^2 L_{XX} + 2L_X L_{XY} L_Y + L_Y^2 L_{YY}}{L_X^2 + L_Y^2}$$

Of main interest are the local extrema closest to the shadow of the X-ray opaque collimation material. As on average the shadow of X-ray opaque material has higher greyscale pixel values compared to the greyscale pixel values of the irradiation fields, only the local minima must be preserved.

The measure of dissimilarity Diss is computed out of the squared gradient magnitude and $L_{WW}$ as:

Diss=$(L_X^2+L_Y^2)$*max$(1-L_{ww},1)$

Figure 1:
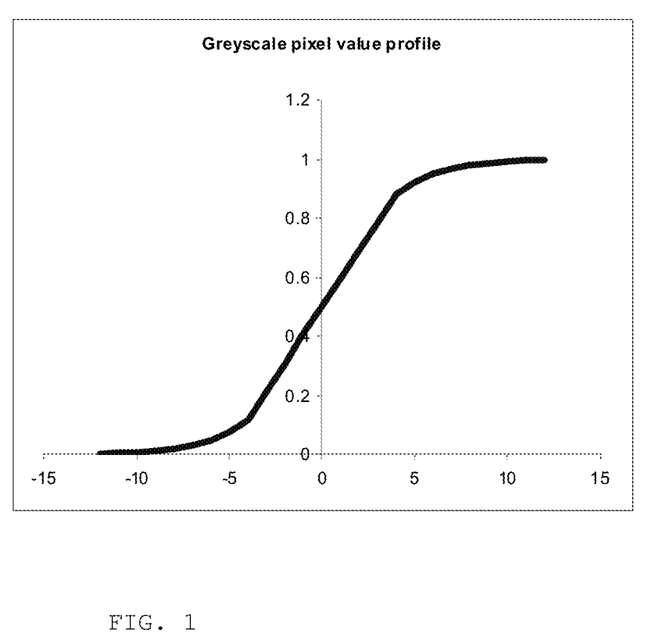
FIG. 1 shows the greyscale pixel profile of a transition zone between irradiation field at the left side and collimation region at the right side.
Figure 2:
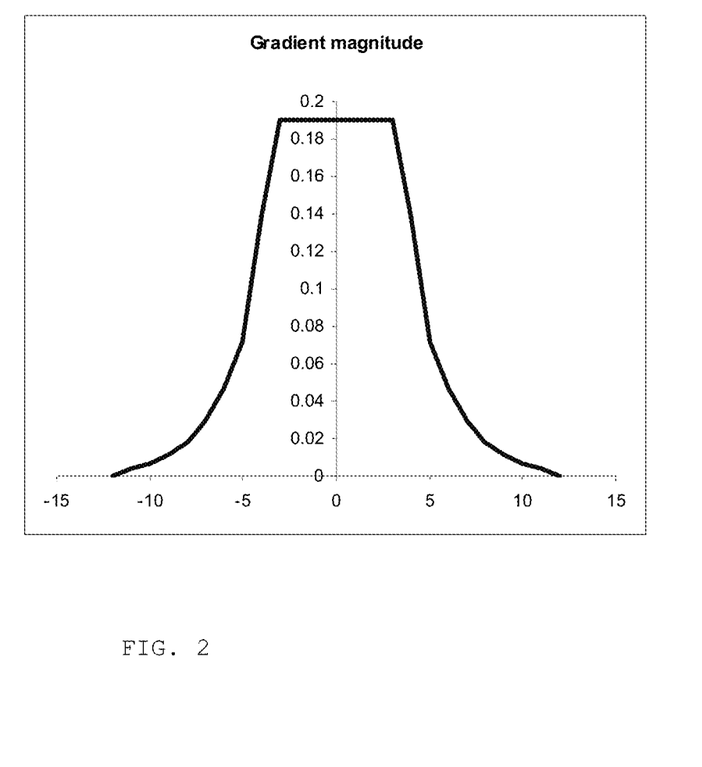
FIG. 2 shows the gradient magnitude of the profile shown in FIG. 1.
Figure 3:
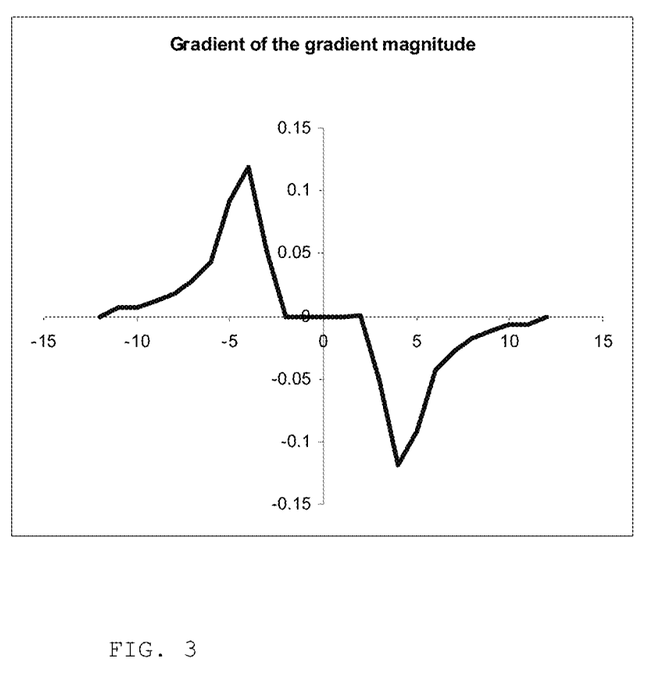
FIG. 3 shows the gradient of the gradient magnitude shown in FIG. 2.
Figure 4:
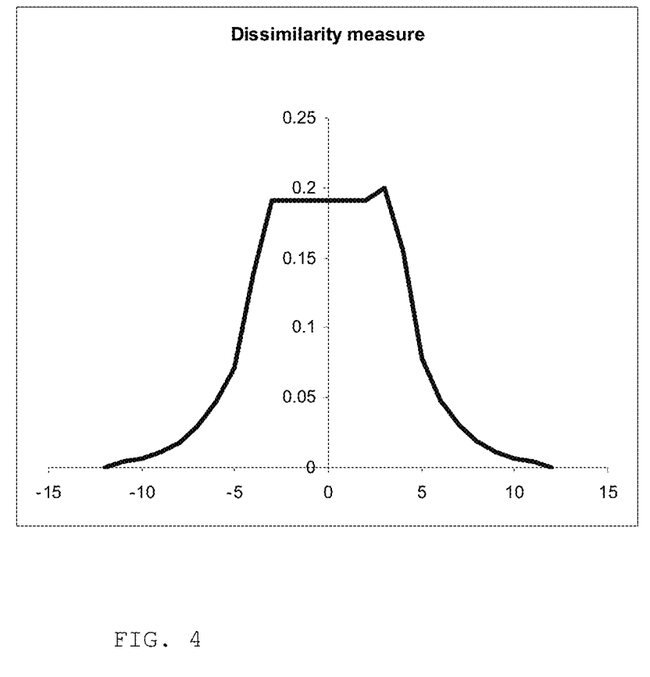
FIG. 4 shows the computed measure of dissimilarity for the profile shown in FIG. 1.

FIG. 1 shows the greyscale pixel profile of a transition zone between irradiation field at the left side and collimation region at the right side. FIG. 2 shows the gradient magnitude of the profile shown in FIG. 1. FIG. 3 shows the gradient of the gradient magnitude shown in FIG. 2. FIG. 4 shows the computed measure of dissimilarity for the profile shown in FIG. 1. The measure of similarity has a maximum corresponding with the largest gradient change near the collimation region.

In this embodiment the multi-scale watershed segmentation is preferably limited to rather fine scales as for coarser scales the blurring effect can remove important low contrast edges.

The outcome of the segmentation by the multi-scale watershed technique is a map of multiple small regions. These small regions can be grouped or clustered to obtain an improved and more accurate segmentation of the image.

Different clustering algorithms are available.

In this embodiment the hierarchical clustering technique is used, more specifically agglomerative hierarchical clustering.

In agglomerative hierarchical clustering individual data points are considered as clusters that are successively pairwise combined into parent clusters.

The combination of the clusters is repeated until the whole dataset is merged into 1 cluster. In this way a hierarchy or tree structure is created by tracing which clusters are merged.

In each iteration the most similar pair of clusters is merged.

The measure of similarity or distance between a pair of clusters is based on the median pixel value of the individual regions $m_k$ and the standard deviation of the pixel values within the individual regions $s_k$.

Several variants of hierarchical clustering exist which differ in how the distance between a pair of clusters is defined in terms of their members.

In this embodiment the complete-linkage clustering, alternatively known as pairwise maximum-linkage clustering is used. For this type of hierarchical clustering the distance between a pair of clusters is defined as the maximum distance among the pairwise distances between the members of both clusters.

As distance measure the Euclidean distance is used:

$$dist(A, B) = \max\left\{\sqrt{(m_k - m_l)^2 + (s_k - s_l)^2} : k \in A, l \in B\right\}$$

The dataset on which the hierarchical clustering is applied is limited to regions with a minimum size, further referred to as large regions, as the standard deviation becomes an unpredictable measurement of variability for small populations.

Figure 5:
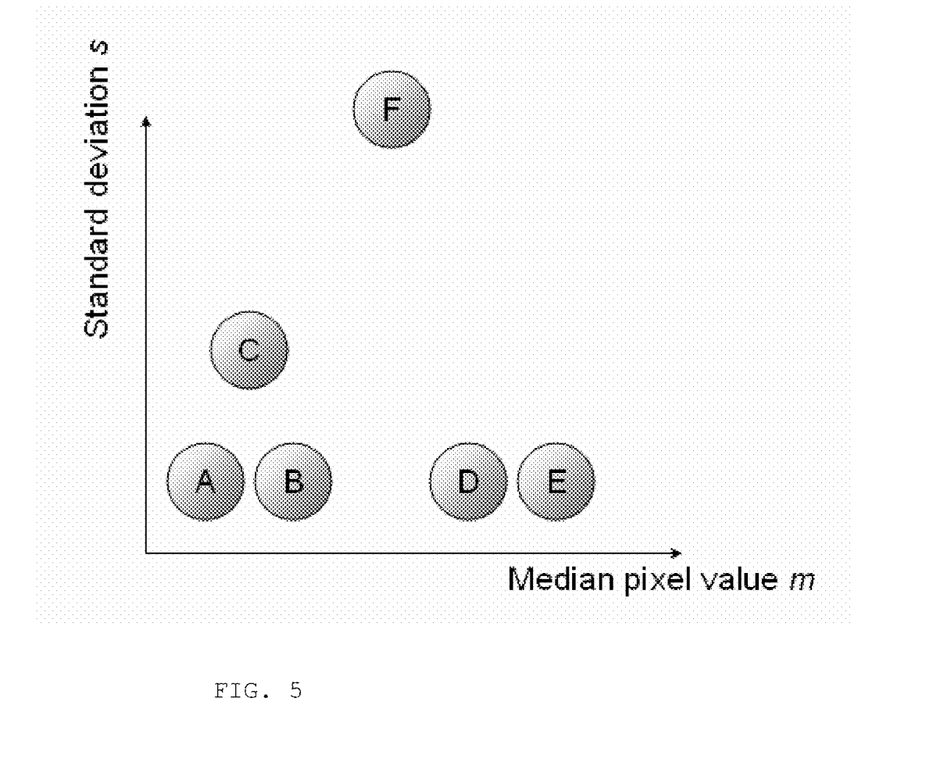
FIG. 5 is an example dataset.
Figure 6:
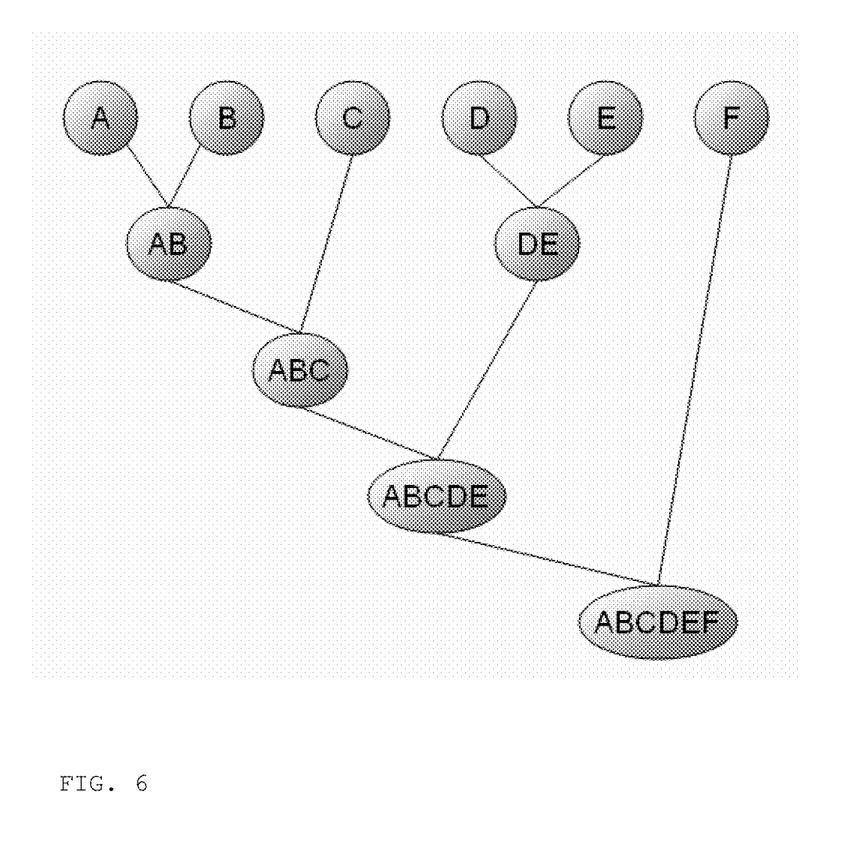
FIG. 6 shows the hierarchical clustering tree of the example dataset shown in FIG. 5.

FIG. 6 shows the hierarchical clustering tree of the example dataset shown in FIG. 5. For example the similarity between cluster 'ABC' and cluster 'DE' will be the distance between member A and member E as this is the largest distance among all the pairwise distances between the members of both clusters.

As the linking and merging of all the clusters into 1 cluster is of no interest in this embodiment, stop criteria are defined to stop the hierarchical clustering at an intermediate result. Possible stop criteria for the hierarchical clustering are: the total number of clusters is reduced to a predefined fraction of the original number of regions, or the smallest distance between a pair of clusters exceeds a maximum distance, or the combination of the aforementioned stop criteria.

In a last step the small individual regions, which are not involved in the hierarchical clustering, are merged with the most similar cluster of large regions.

The measure of similarity is based on the median pixel value of the small region and the cluster of large regions $m_k$ and the position of the small region and the cluster of large regions in the image ($posX_k$, $posY_k$). The position of a region is computed as the centre of gravity i.e. the average position in X and Y direction of all the pixels of that region. To compute the median pixel value and the position of a cluster of large regions all the pixels of the members of the cluster are taken into account.

The Euclidean distance is used as distance measure between a small region s and a cluster of large regions L:

dist(s,L)=
$$\sqrt{(m_s-m_L)^2+(posX_s-posX_L)^2+(posY_s-posY_L)^2}$$

Fitting of Line Segments

A next step in the segmentation process is fitting line segments to the boundaries of the segmented regions.

In this embodiment the Hough transform is used to extract straight line segments.

For persons skilled in the art it is known to adapt the technique to extract other shapes of irradiation fields such as circles or ellipses.

The Hough transform is a feature extraction technique. The purpose is to localize in an image imperfect instances of objects with a specific shape by a voting procedure.

The shape of interest is specified by a parametric equation. Votes are accumulated in parameter space referred to as Hough space.

Figure 7:
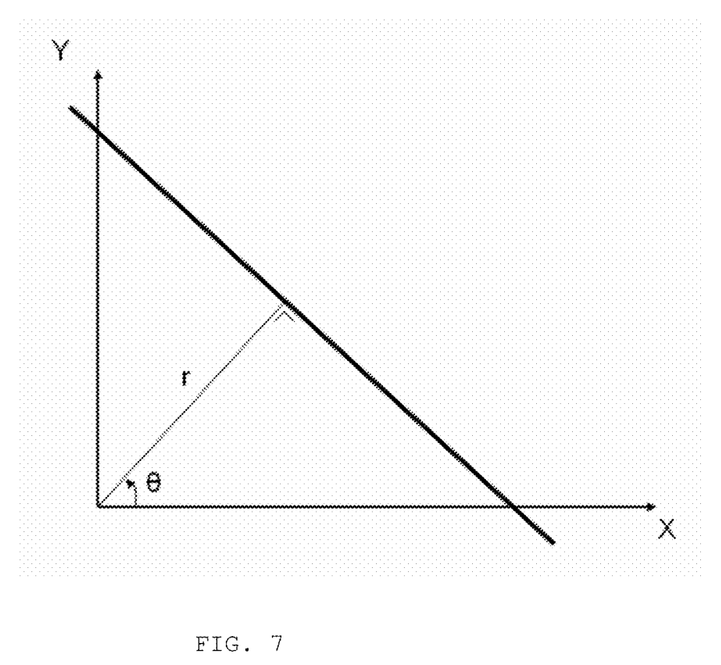
FIG. 7 shows the parameterized equation of a straight line.

The parameterized equation used for the extraction of straight lines is:

$$r = x \cos \theta + y \sin \theta$$

with parameter r the perpendicular distance between the line and the origin and parameter θ the direction perpendicular to the line orientation (see FIG. 7).

The Hough space is quantized for both parameters.

If a pixel is considered to be an edge pixel, for every orientation of interest θ, the corresponding parameter r is computed where (r, θ) specifies a line through the edge pixel. In the voting step the values of the corresponding bins in the quantized parameter space are increased for all the computed (r, θ) pairs. This way an accumulator space is generated. Significant straight lines in the images can be found as local maxima in the Hough space.

In this embodiment the basic implementation of the Hough transform is improved to extract more selectively the boundaries of the irradiation fields.

In the voting step of the basic implementation of the Hough transform, the accumulated weights are increased with a predefined value, usually 1.

A more selective voting method is used in this embodiment. The strength of the vote is weighted for the gradient magnitude and gradient orientation.

The gradient vector is projected to the different discrete directions [0, Pi [ for which the Hough parameter space is computed. The length of the gradient vector is first normalized and clipped to a specified percentile of the gradient distribution in the image. Gradient vectors with a magnitude above the percentile will have a normalized length of 1 and gradient magnitudes below the percentile are linearly rescaled between [0, 1[. The clipping prohibits excessive responses to strong edges in the image. The projection of the gradient vector to a particular direction results in a more selective voting and cancels out weight accumulation of opposite gradients in the basic Hough transform (e.g. chessboard patterns).

The computed Hough space is normalized such that a line segment with maximum length for a particular orientation and position in the image will have absolute value 1.0 in the Hough space. The values in the normalized Hough space are thus independent of the aspect ratio and dimensions of the image.

The normalization is applied by dividing the Hough space by a $2^{nd}$ Hough space. This $2^{nd}$ Hough space is computed under the assumption that every pixel in the greyscale image is an edge pixel.

Although the above described improvements tackle some general known drawbacks of the basic Hough transform, further corrections to the computed Hough space may be implemented to overcome some issues with respect to the detection of the boundaries of the irradiation fields.

An irradiation field can be very small with respect to the whole image area, e.g. DR images of paediatric fingers. An irradiation field can also be very elongated and it can have an aspect-ratio different from the aspect ratio of the image itself.

This results in very low accumulated values in the Hough space for the boundaries of such small or elongated irradiation fields.

The above mentioned issues can be tackled by estimating a best-fit bounding box of the irradiation fields in the image, i.e. the oriented, smallest rectangle enclosing all the pixels belonging to the irradiation fields present in the image.

The bounding box indicates roughly the maximum line segment length and thus maximum accumulated weights that can be found for 2 perpendicular directions.

Figure 8:
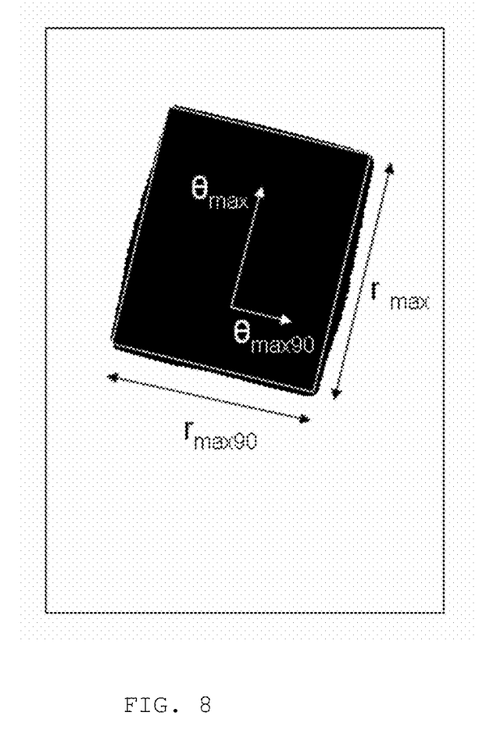
FIG. 8 is an illustration of a bounding box.

Such a bounding box can be computed by thresholding the greyscale image. Thresholding results in a binary mask indicating the pixels below a threshold, hence the darkest regions in the image. FIG. 8 shows such a binary mask and the best-fit bounding box.

To estimate the orientation of the bounding box, the main direction in the image is computed out of the Hough space. The main direction is the direction with the most and longest line segments. For every direction e the cumulative sum of the Hough space is computed. Only a predefined percentage of longest line segments for orientation θ are taken into account. The direction with the highest cumulative sum $\theta_{max}$ is considered to be the main direction in the image and defines the orientation of the bounding box.

To compute the dimensions of the bounding box, the Hough transform of the binary mask is analysed along the main direction $\theta_{max}$ and along its perpendicular direction $\theta_{max90}$.

As the binary mask gives a rough, noisy estimation of the irradiation fields, the bounding box must enclose just a percentage of the indicated irradiation field pixels.

The total sum of the Hough space of the binary mask is computed along the profile of the main direction $\theta_{max}$. This profile is analysed starting at the 2 outer points until the cumulative sum exceeds a predefined threshold. The same analysis is applied to the profile along the perpendicular direction.

In this way the size, orientation and position of the bounding box is found and thus the maximum line segment length $r_{max}$ for the main direction $\theta_{max}$ and the maximum line segment length $r_{max90}$ for the perpendicular direction. This can be used to apply a multiplicative correction to the normalized Hough space for the different angles between [0, Pi [:

$$\text{Corr}BB(\theta) = 1.0/[r_{max} + (r_{max90} - r_{max}) * (0.5 - 0.5 * \cos(2.0*(\theta - \theta_{max})))]$$

The irradiation field boundaries are short compared to the total image length or width in case of multiple irradiation fields in 1 image.

The number of irradiation fields can be computed by searching the Hough space for 2 parallel or slightly tilted line segments with opposite polarity. Such pairs indicate the small shadows of the x-ray opaque material between irradiation fields. If such pairs of line segments with opposite polarity are found, a correction can be applied to the Hough space for the perpendicular direction.

If the image is composed of multiple irradiation fields, these tend to be roughly aligned with the main image directions. In that case, the search range for a pair of line segments with opposite polarity is limited to a range of −10 to +10 degrees around the main directions $\theta_{max}$ and $\theta_{max90}$. The number of the detected pairs of line segments and their position within the bounding box determines the correction factors that are applied.

Figure 9:
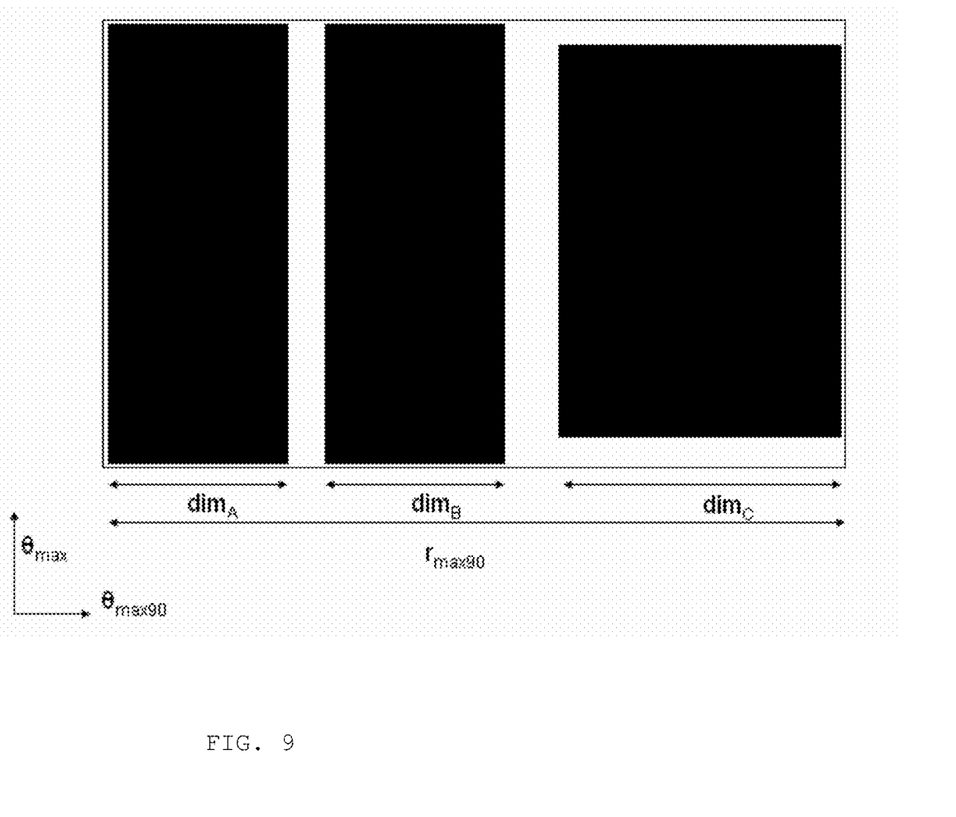
FIG. 9 illustrates the case of multiple irradiation fields.

The number of irradiation fields in a cross-section along the main directions ($N_{irr}$ and $N_{irr90}$) equals the number of detected line pairs along that direction plus 1. The width or length of the individual radiation fields is computed as the distance between the line pairs and the distance between the line pairs and the bounding box boundaries as shown in FIG. 9.

The maximum distance is used to compute the multiplicative correction factors for the both main directions:

$$CorrPart_{\theta_{max}90} = \frac{r_{max90}}{\max(dim_i : i \in [0, N_{irr}[)}$$

$$CorrPart_{\theta_{max}} = \frac{r_{max}}{\max(dim_i : i \in [0, N_{irr90}[)}$$

A multiplicative correction is applied to the normalized Hough space for the different angles between [0, Pi [:

$$CorrPart(\theta) = CorrPart_{\theta_{max}} + (CorrPart_{\theta_{max}90} - CorrPart_{\theta_{max}})*0.5*(1-Cos(2*(\theta-\Theta_{max})))$$

After applying the above described corrections to the computed, normalized Hough space, the boundaries of the irradiation fields should have a theoretical Hough space value of ca. 1.0.

Out of the normalized, corrected Hough space the strongest edges are selected as the local maxima with a value above a predefined threshold.

To ensure that no important irradiation field boundaries are missed, the set of Hough edges is checked against the position of the bounding box computed for the correction of the Hough space. If no Hough edge is detected in the neighbourhood of a side of the bounding box, the strongest Hough edge is added with the appropriate orientation and position, even if the corresponding Hough value is below the predefined threshold.

Every local maximum in the Hough space corresponds with a line that runs completely through the image. The line is divided into separate line segments determined by the crossings with the other preserved Hough edges. Only line segments are preserved with a significant overlap with the region boundaries (the result of the multi-scale watershed segmentation and hierarchical clustering). The preserved line segments divide the image in multiple regions with straight boundaries. Labelling these individual regions defines a new segmentation map referred to as Hough segmentation map.

Classification

The line segments comprised in the segmentation map define non-overlapping image regions, called Hough regions further on.

A binary classification is applied to the Hough segmentation map to identify the regions that are part of the irradiation field and the regions that are part of the shadow of the x-ray opaque material.

For this classification local, regional and global image characteristics are used.

Different classification methods are available.

In this embodiment a perceptron is used which is the simplest kind of feedforward neural network, in fact a linear classifier:

$$class(x) = \begin{cases} 1 & \text{if } \sum_{i=1}^{p} w_i x_i - \theta > 0 \\ 0 & \text{if } \sum_{i=1}^{p} w_i x_i - \theta \leq 0 \end{cases}$$

with x the vector of feature values $[x_1, x_2, \ldots, x_p]$, w the vector of weights and $\theta$ a bias term. More detailed information about percetrons and adjusting the weight vector w can be found in "Neural Networks: A Comprehensive Foundation" by Simon Haykin, ISBN 0-02-352761-7.

An important characteristic for distinguishing irradiation fields from collimated, non-diagnostic regions is the local standard deviation. The local standard deviation of non-diagnostic regions is rather low compared to the local standard deviation of diagnostic image regions. In general, there are more local pixel value variations in a diagnostic region.

The distance between the histogram of local standard deviation of the Hough regions and the global histogram of local standard deviation of the whole image is a strong feature to be used in the classification. As distance measure the Euclidean distance is used. The Euclidean distance between 2 histograms is computed by summing the squared differences between the bin counts of both histograms, assuming both histograms have the same binning, and are normalized to the same cumulated count:

$$dist(hist_A, hist_B) = \sqrt{\sum_{i=0}^{nbins-1} (cnt_A[i] - cnt_B[i])^2}$$

If most of the image area consists of diagnostic regions, the non-diagnostic regions will have a large distance to the global histogram of local standard deviation and the diagnostic regions will have a small distance to the global histogram of local standard deviation.

For images with a small diagnostic region with respect to the total image area, the histograms of the non-diagnostic regions will be very similar to the global histogram of local standard deviation and thus will have a smaller distance compared to the distances of the histograms of diagnostic regions.

Therefore there is need for a second distance measure. The reference histogram is in this case computed as the histogram of local standard deviation of only the bright regions in the image.

To compute this reference histogram only the local standard deviation values are taken into account of the corresponding pixels with a greyscale value above a predefined threshold.

Unlike the first Euclidian distance, this distance will be small for non-diagnostic regions and large for diagnostic regions.

Another characteristic computed out of the histograms of local standard deviation of the different regions is the cumulative sum of the bin counts of the normalized histograms of the first N bins with N the bin number for which the cumulated, normalized bin counts of the global histogram of local standard deviation exceeds a predefined value. As we stated that non-diagnostic regions have on average a lower local standard deviation compared to the diagnostic regions, this will result in higher cumulative sums for the non-diagnostic regions.

Another characteristic used is the amount of strong edges. Diagnostic regions will contain more strong edges than non-diagnostic regions. A pixel is considered to be part of a strong edge if the local standard deviation exceeds a predefined threshold.

The characteristic is expressed as the amount of pixels in a region for which the local standard deviation exceeds the predefined threshold, relative to the total number of pixels in the region.

Another strong feature to be used in the classification is the difference in grey pixel values between a region and its surrounding regions. The boundaries of the irradiation fields are characterized by dark pixels at the inner side and brighter pixels at the outer side. The average greyscale pixel value difference at the boundaries of the Hough regions is an indicator to classify the regions as irradiation field or collimation region.

The above described list of characterizing features can be extended with other features as the median or average greyscale pixel value of a Hough region, the positions within the image, shape characteristics (e.g. aspect-ratio), the presence of burned pixels, etc.

Using the above described features a feature vector is created for each individual region in the Hough segmentation map. Using this feature vector as input of the perceptron an accurate classification is achieved for each region in the Hough segmentation map. The result is a binary map delineating the irradiation fields in a radiographic image.

The binary map can be converted to more compact representations.

In an embodiment the representation is run-length encoded.

In another embodiment the representation is a set of polygons extracted from the binary map.

The invention claimed is:

1. A method of extracting irradiation field areas in an X-ray image represented by a digital signal representation, the method comprising the steps of:
   first, segmenting the X-ray image into regions of pixels that have similar local image characteristics by image clustering to merge regions which have similar local image characteristics;
   second, and after the first step, fitting line segments to boundaries of the merged regions so that the line segments correspond with candidate irradiation field boundaries and define a segmentation map; and
   third, and after the second step, classifying regions in the segmentation map into a first class defining an irradiation field region and a second class defining a collimated region based on at least one of local, regional, and global image characteristics; wherein
   a Hough transform is applied to the boundaries of the merged regions to fit the line segments corresponding with the candidate irradiation field boundaries, and a best-fit bounding box of the candidate irradiation field boundaries is determined based on a maximum line segment length in a main direction of the X-ray image and a maximum line segment length in a direction of the X-ray image perpendicular to the main direction.

2. The method according to claim 1, wherein the step of segmenting the X-ray image into regions is based on multi-scale watershed segmentation.

3. The method according to claim 1, wherein the image clustering includes hierarchical clustering with a measure of similarity based on at least one of a median or an average greyscale pixel value of a segmented region, a standard deviation of greyscale pixel values within a segmented region, and a position of a segmented region in the X-ray image.

4. The method according to claim 1, wherein the Hough transform is normalized and corrected so that Hough space values of the boundaries of the candidate irradiation fields in the X-ray image have an approximate value of 1.0.

5. The method according to claim 1, wherein only line segments are preserved that have a significant overlap with the boundaries of the merged regions.

6. The method according to claim 1, wherein the regional image characteristics are computed out of histograms of local standard deviation of the segmented regions.

7. The method according to claim 6, wherein one of the regional image characteristics computed out of the histograms of the local standard deviation is a distance measurement between the histograms and a histogram of local standard deviation of the total X-ray image.

8. The method according to claim 6, wherein one of the regional image characteristics computed out of the histograms of the local standard deviation is a distance measurement between the histograms and a reference histogram of local standard deviation of only brightest regions in the X-ray image.

9. The method according to claim 6, wherein the histograms of the local standard deviation are normalized to create normalized histograms of local standard deviation; and one of the regional image characteristics computed out of the normalized histograms of local standard deviation is a cumulative sum of the histogram below a specified histogram abscissa.

10. The method according to claim 1, wherein the regional image characteristic is an amount of strong edges in different segmented regions.

11. The method according to claim 1, wherein the regional image characteristic is an average greyscale pixel difference between a region of interest and its surroundings in a neighbourhood of the boundaries of the region of interest.

12. The method according to claim 1, wherein the step of classifying the regions into a first class and a second class defines a binary classification and is performed using a perceptron.

13. A non-transitory computer-readable recording medium comprising computer executable program code adapted to carry out the method of claim 1 when the computer executable program code is run on a computer.

* * * * *